July 9, 1940.　　　　　　　F. W. QUIDAS　　　　　　2,206,919
SCALE FOR COMPOUNDING FORMULAS AND OTHER PURPOSES
Filed Nov. 16, 1937
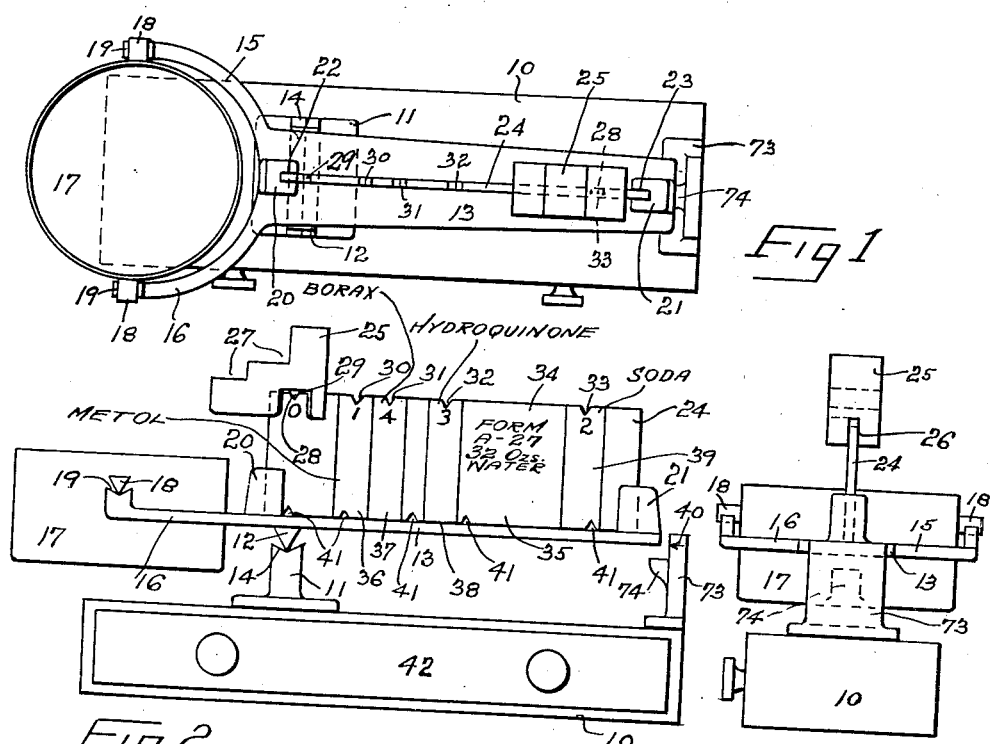
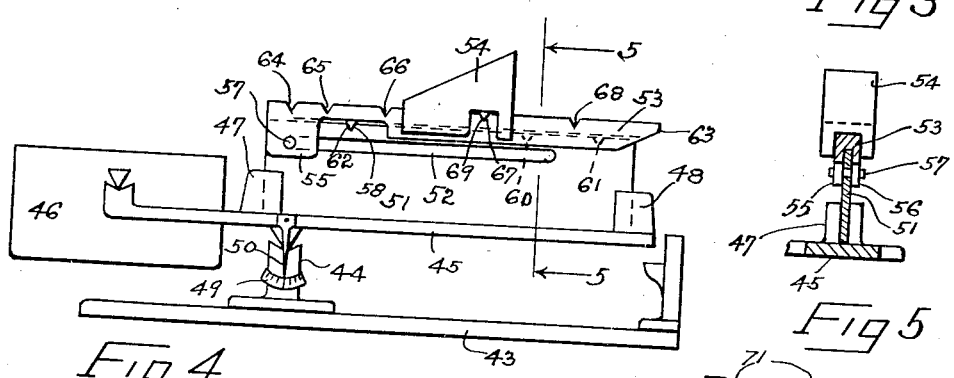
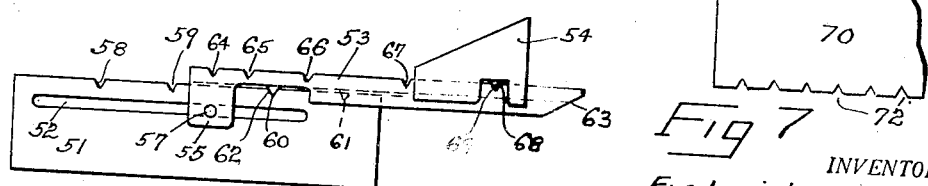
INVENTOR.
Frederick W. Quidas
BY
ATTORNEYS.

Patented July 9, 1940

2,206,919

UNITED STATES PATENT OFFICE 2,206,919

SCALE FOR COMPOUNDING FORMULAS AND OTHER PURPOSES

Frederick W. Quidas, New York, N. Y.

Application November 16, 1937, Serial No. 174,737

2 Claims. (Cl. 265—30)

The invention relates to weighing scales of the type having a pan at one end and a beam at the other. It has for one of its main objects to provide a pair of scales by means of which mixtures may be compounded from formulas without any danger of miscalculating the amount of any of the ingredients called for by the formula and without the danger of adding the ingredients of the formula in the wrong sequence. Another object is to so construct the scales that by simply substituting one part for another on the scale, or by merely turning this part over, ingredients named in other and different formulas may be weighed out.

A further object is to so construct these removable and interchangeable parts that the ingredients of the formulas may be imprinted directly on these parts, so that the formula will always be available when needed.

A still further object is to provide a scale which may be used for various systems of weight, such as for example metric, troy or avoirdupois, by merely substituting one part for another. Additional objects are to provide a scale which will be accurate in its operation, simple in construction, easy to manipulate, and on which very small quantities may be measured due to the particular construction of the sliding weight employed.

These and various other objects and advantages will be readily understood from the following description and from the accompanying drawing, in which, modifications may be made without departing from the scope of the appended claims. In the drawing, Fig. 1 is a plan view of a scale constructed in accordance with the invention;

Fig. 2 is a side elevation of Fig. 1;

Fig. 3 is a rear view;

Fig. 4 is a side elevation of a certain modification;

Fig. 5 is a fragmental, cross-sectional rear view of certain parts in Fig. 4, and taken on line 5—5 in that view;

Fig. 6 is a side elevation of certain parts of Fig. 4, but shown in different positions; and Fig. 7 is a fragmental side elevation of one of the interchangeable plates used with the scale.

Referring first to Figs. 1, 2 and 3, the scales consist of a base 10, on which a vertical bracket 11 is mounted. The knife-edge support 12 of the beam scale 13 rests in an angular notch 14 cut in the top of the pedestal. The forward end of the beam is bifurcated so as to form two arms 15 and 16 and between these arms a scale pan 17 is mounted on trunnions 18, which rests in notches 19 formed near the outer ends of the arms. Two upright members 20 and 21 are preferably formed integrally with the scale beam and on top thereof. Slots 22 and 23 are formed in the sides of the uprights which face each other so as to form two sockets into which a rectangular plate 24 will fit snugly.

The parts so far described are so constructed that the parts to the right of the knife-edge support will balance the parts to the left of the poise, or in other words that the beam will be balanced when the plate 24 is inserted in the socket. A weight 25 is slidingly mounted on top of the plate 24 by means of a slot 26 cut in the lower side in the weight. For reasons to be explained later this weight is preferably stepped, as shown at 27, and it is provided with a detent 28 adapted to fit in anyone of a plurality of notches 29, 30, 31, 32 and 33 formed in the upper edge of the plate 24. The weight is so proportioned that when the detent 28 is in the notch 29, the scale will still be in balance.

The particular plate 24 shown here is used for compounding a mixture from a certain formula, as for example a formula for development of a photographic film. In this instant the identification number of the formula is shown at 34, the amount of water required with the formula at 35 and the various ingredients used with the formula at 36, 37, 38 and 39. By placing the detent 28 of the weight in the notch 30, the proper quantity of the ingredient shown underneath that notch may be measured off in the scale pan. Similarly, by placing it in the other notches, the proper quantities of the chemicals shown under these notches may be weighed, thus assuring the proper quantity of each ingredient without any danger of error, as often occurs when an ordinary scale is employed.

When it is essential that the ingredients are mixed in a certain sequence, the ingredients are numbered, as indicated by the numerals 1, 2, 3, and 4, shown near the top of the plate. In other words, in the formula given on the plate 24, the proper quantity of Metol is first weighed, next the soda, then the hydroquinone and finally the borax. Thus, not only does the plate indicate and aid the measuring of the proper quantity of each ingredient, but indicates the sequence in which they should be put into the mixture.

To facilitate the operation of the scale, particularly when the weight 25 is moved along the plate 24, a vertical member 73 is mounted at one end of the base and on this a bracket 74 is formed. As the weight is moved rearwardly on the plate 24, the beam will rest on this bracket until balanced by the material poured into the scale pan. To facilitate the ascertaining of the proper balance an arrow 40 may be employed on the member 73.

The plates 24 are not only made interchangeable so that one may be substituted for another, but they are preferably imprinted with formulas on both sides so that each plate may serve for two formulas. When this is done a plurality of notches 41 are also formed in the lower edge of the plate and these notches correspond to the ingredient printed on the other side of the scale, as previously explained. A drawer 42 may be formed in the base and in this drawer the formula plates, and other parts of the scale, may be conveniently stored when not in use.

In Figs. 4, 5 and 6, substantially the same scale is shown but with a modified formula plate. The base, which in this case is plain, is shown at 43, the pedestal at 44, the scale beam at 45, the scale pan at 46, and the upright members at 47 and 48. In this instant an arcuated, graduated scale 49 is shown mounted on the pedestal and a pointer 50 on the scale beam, to facilitate the balancing of the scales.

The formula plate 51, in this instant is provided with a slot 52 and with a sliding bar 53 on which the weight 54 is slidingly mounted. The front end of the sliding bar 53 is provided with downwardly-extending members 55 and 56 and in these members a pin 57 is mounted. This pin engages in the slot 52 when the sliding bar is moved along on the top edge of the plate 51. The notches 58, 59, 60 and 61 are formed in the top edge of the plate and a detent 62 is formed on the sliding bar and is adapted to engage in any one of these notches.

It will be seen that by lifting up the free end 63 of the sliding bar, the detent may be disengaged from the notch and the bar moved in either direction to engage in any other notch. Notches 64, 65, 66, 67 and 68 are cut in the top edge of the sliding bar and in these notches a detent 69 of the weight engages. In this case the scale is also so arranged that when the sliding bar is in the position shown in Fig. 4 and the detent 69 of the weight engages in the slot 64, the scale will be in balance. This construction makes it possible to weigh larger quantities by moving the sliding bar on the plate in addition to moving the weight on the sliding bar. In Fig. 6 the parts shown in Fig. 4 are shown in different positions.

Fig. 7 shows a plate 70 having a set of notches 71 at its upper edge and another set of notches 72 at its lower end. This plate is used for different systems of weight, for example metric weight on one edges of the scale and avoirdupois on the other edge. In this case, of course, the notches are graduated and numbered in the regular manner.

By constructing the weight in the manner shown, both in Fig. 2 where it is stepped and in Fig. 4 where it is shown with a slanting top face, it is possible, by having the notches very close together, to make very small variations in weight between each notch, particularly at the left-hand end of the plate.

It will be noted that the center of gravity of the weight is to one side of the center of its length, and that the detent which engages in the notches on the formula plate is directly below the center of gravity.

While, for the purpose of simplifying the drawing and the description, the very simplest and elementary means have been shown for supporting the scale beam on its pedestal, it will, of course, be understood that any other well known standard construction may be used and that many other changes may be made in the general construction of the device.

Having described the invention and its objects, what I claim as new and wish to protect by Letters Patent is:

1. In a weighing scale of the class described having a base and a pedestal; a scale beam poised on said pedestal and having a removable scale pan at one end and means on the other end for supporting a removable, elongated vertical plate longitudinally with the beam; indentations formed in said plate; a weight slidingly mounted on said plate and having a detent engageable in said indentations; and the center of gravity of the weight located to one side of its length by stepping the upper part of the weight.

2. A device for compounding a mixture in definite proportions by weight, comprising, in combination, a base, a pedestal mounted on the base and having two knife-edge supports spaced apart on the same line, a scale-beam having two knife edges, one on each side, spaced apart on the same line and resting upon the pedestal knife-edge supports, said scale-beam being bifurcated at one end and having two aligned knife-edge supports on the forks, a receptacle having two diametrically opposed and aligned knife-edges, one on each side, so positioned that they engage the knife edges on the forks, two uprights on the scale-beam, each upright having a vertical slot therein oposed to the other slot and in the longitudinal central vertical plane of the scale-beam to receive a selected indicia plate, an indicia plate detachably mounted in said slots, the top edge of the plate being provided with a series of longitudinally spaced notches along the top thereof, the distance of said notches from the fulcrum of the scale-beam being proportioned to the weights of ingredients of the mixtures, a weight having a longitudinal slot in the bottom thereof, a transverse ridge extending across said slot and engageable with the notches in the top of said plate, and a second pedestal mounted on said base on the side of the fulcrum opposite said receptacle and having a stop engageable by said scale-beam.

FREDERICK W. QUIDAS.